(12) United States Patent
Chen et al.

(10) Patent No.: US 6,717,083 B2
(45) Date of Patent: Apr. 6, 2004

(54) POLARIZING DEVICE INTEGRATED WITH TOUCH SENSOR

(75) Inventors: Pin-Shen Chen, Chung-Li (TW); Shih-Chieh Jang, Chung-Ho (TW)

(73) Assignee: Eturbotouch Technology Inc., Taiwan (CN)

(*) Notice: Subject to any disclaimer, the term of this patent is extended or adjusted under 35 U.S.C. 154(b) by 0 days.

(21) Appl. No.: 10/369,523

(22) Filed: Feb. 21, 2003

(65) Prior Publication Data

US 2003/0121766 A1 Jul. 3, 2003

Related U.S. Application Data

(62) Division of application No. 10/020,182, filed on Dec. 18, 2001, now Pat. No. 6,605,789.

(51) Int. Cl.[7] .................................................. H01H 9/00
(52) U.S. Cl. ...................................... 200/310; 200/5 A
(58) Field of Search ............................... 200/5 A, 6 A, 200/510–517, 310–317, 341, 345

(56) References Cited

U.S. PATENT DOCUMENTS

| | | |
|---|---|---|
| 4,726,659 A * | 2/1988 | Conrad et al. ............... 349/128 |
| 4,785,564 A | 11/1988 | Gurtler |
| 4,909,605 A | 3/1990 | Asano et al. |
| 5,578,404 A | 11/1996 | Kleim |
| 5,917,437 A | 6/1999 | Ojala et al. |
| 6,034,335 A | 3/2000 | Aufderheide et al. |
| 6,108,064 A | 8/2000 | Minoura et al. |
| 6,362,815 B1 | 3/2002 | Leenhouts |
| 6,424,403 B1 | 7/2002 | Leenhouts et al. |
| 6,444,280 B1 | 9/2002 | Matsuoka et al. |
| 6,605,789 B2 * | 8/2003 | Chen et al. ................... 200/310 |

FOREIGN PATENT DOCUMENTS

| | | |
|---|---|---|
| EP | 10466944 | 10/2000 |
| JP | 1078220 | 3/1989 |
| JP | 4019640 | 1/1992 |

* cited by examiner

*Primary Examiner*—Michael Friedhofer
*Assistant Examiner*—Lisa Klaus
(74) *Attorney, Agent, or Firm*—Lowe Hauptman Gilman & Berner, LLP (57) ABSTRACT

A polarizing device has a polarizing layer, a first protection layer, a second protection layer, a conductive layer, an insulating layer, an electrode layer and a hardening coating layer. When a user touches a monitor, which is implemented with the polarizing device, by his/her finger, the coordinate of the touch point will be detected by monitoring the interference caused on the equivalently generated electric filed.

3 Claims, 7 Drawing Sheets

POLARIZING DEVICE INTEGRATED WITH TOUCH SENSOR

This applicant is a divisional application of U.S. patent application Ser. No. 10/020,182, filed Dec. 18, 2001, now U.S. Pat. No. 6,605,789.

BACKGROUND OF THE INVENTION

1. Field of the Invention

The present invention relates to a touch sensor capable of polarizing a light beam for being employed in a LCD (Liquid Crystal Display) panel or monitor.

2. Background Description

In the present technologies for concerning the convenience and friendship, the user interface is developed to implement ordinary user habits. Thus, users may manipulate the technology products via an interactive human interface, rather than learning lots knowledge and computer instructions, such for computers, home appliances, guiding systems (G.P.S. or others) and personal digital assistance (PDA). The screens of high technology products are able to be clicked in order to input the instructions directly via screens, so-called touch screens. Thus, the user friendly interface is enhanced from ordinary input devices such as mouses or keyboards.

Figure 1:
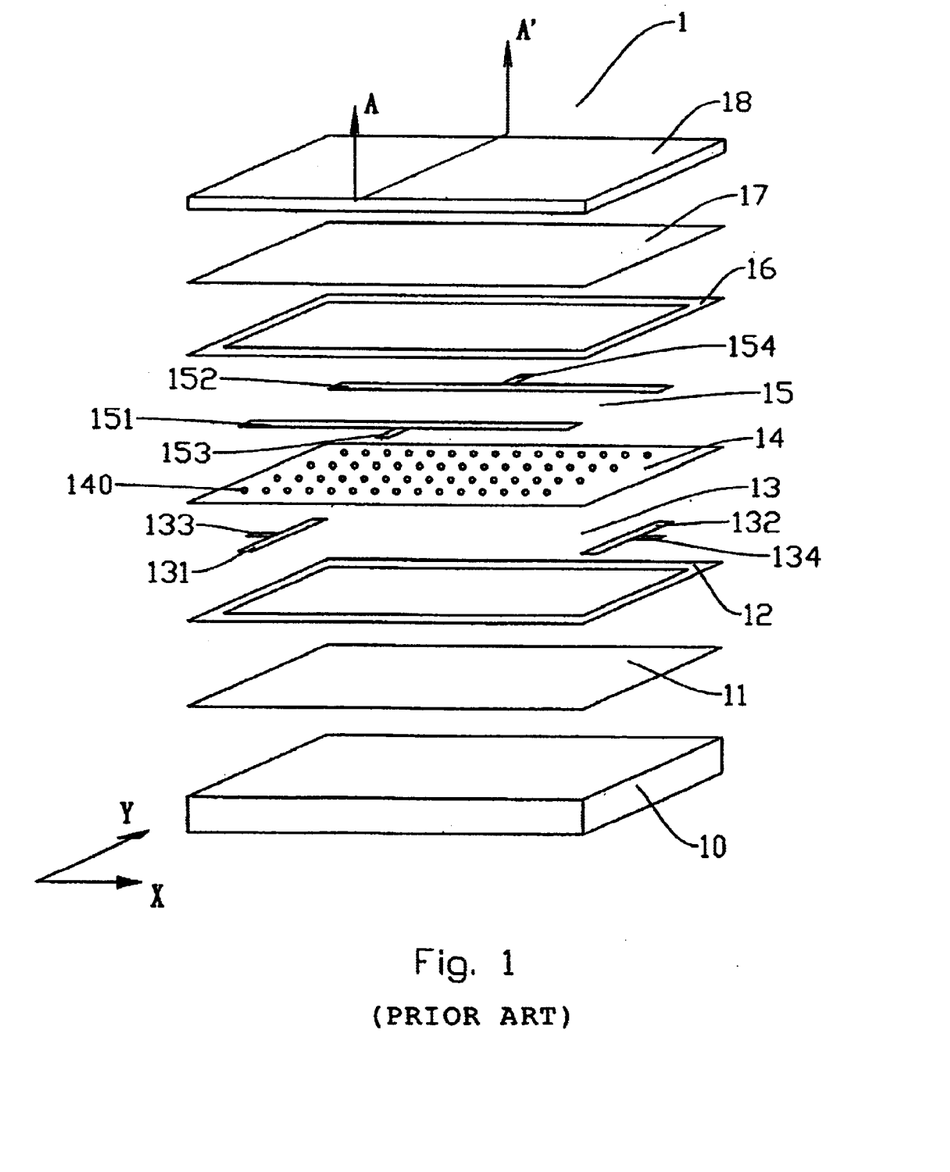
FIG. 1 is the schematic exploded view of the prior known touch sensor.

The touch screens as aforementioned, as shown in FIG. 1, includes a glass substrate 10, a first conductive layer 11, a first insulation layer 12, a first electrode layer 13, an isolation layer 14, a second electrode layer 15, a second insulation layer 16, a second insulation layer 17 and a film 18. The first conductive layer 11 and the second conductive layer 17 are conductive materials, for example Indium Tin Oxide (ITO). The first conducted layer 11 is sputtered to the glass substrate 10. The second conductive layer 17 is also sputtered to the film 18. In this case, both the glass substrate 10 and the film 18 are conductive. After that, the first insulation layer 12 and the second insulation layer 16 are printed to the glass substrate 10 and the film 18 respectively. The first conductive layer 12 and the second conductive layer 16 are designated to spread equipotential voltage filed over the conductive layers. The first electrode layer 13 and the second electrode layer 15 are made by conductive material, such as silver paste. The first electrode layer 13 and the second electrode layer 15 are printed to the first conductive layer 11 and the second conductive layer 17 respectively. A first electrode 131 and a second electrode 132 of the first electrode layer 13 are positioned in parallel. A third electrode 151 and a fourth electrode 152 of the second electrode 15 are also positioned in parallel. The electrode leads 133, 134, 153 and 154 are connected to the first electrode 131, the second electrode 132, the third electrode 153 and the fourth electrode 154 respectively for propagating signals. Once the isolation layer 14 is printed on the first conductive layer 11, a touch screen is completed after combining the glass substrate and the film by an adhesive material.

Figure 2A:
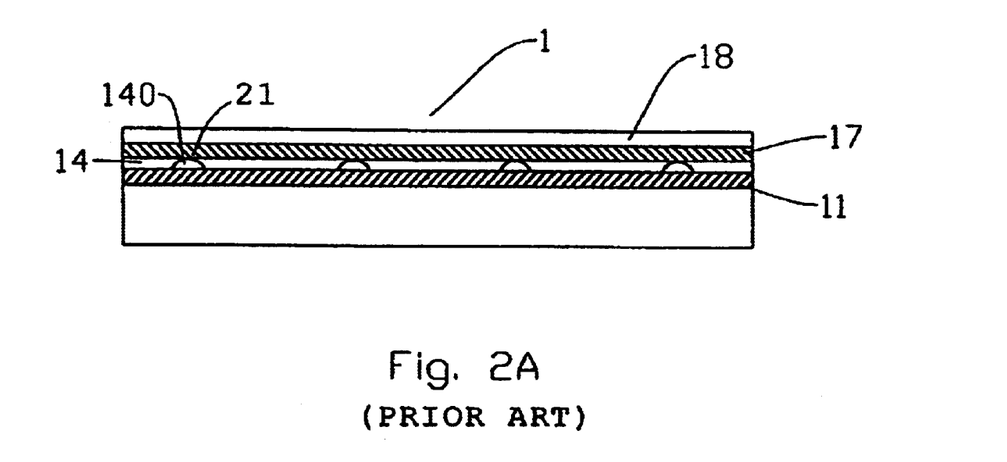
FIG. 2A shows the cross section of the prior known touch sensor.
Figure 2B:
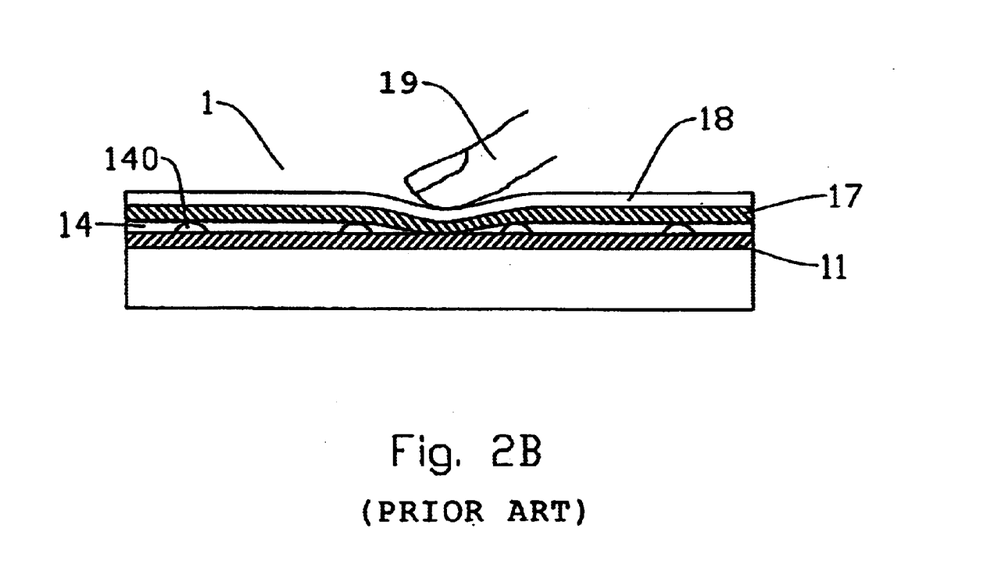
FIG. 2B shows the prior known touch sensor being pressed down.

Please refer to FIG. 2A, the figures shows the cross section along line A–A', especially under the condition that the user does not press down the film or the user does not click on the screen. There is an isolation layer between the first conductive layer 11 and the second conductive layer 17. The isolation layer 14 contains plurality of spacers 140 in order to prevent the contacts between the first conductive layer 11 and the second conductive layer 17. If the first conductive layer 11 and the second conductive layer 17 are not contacted, there will be no signal generated and outputted. Further in view of FIG. 2B, if the user presses down or clicks on the film 18 by user's finger 19, the film 18 will be bent. Thus, the second conductive layer 17 is bent to contact the first conductive layer 11. Since the first electrode 131 is provided a five voltage (5V) via the electrode lead 133 and the second electrode 132 is provided a zero voltage (0V) via the electrode lead 134, there is voltage gap of five voltage (5V) between the first electrode 131 and the second electrode 132. In this case, a general and equivalent equipotential filed from 0V to 5V is generated. If the second conductive layer 17 is bent to contact the first conductive layer 11, the coordinates of the contact point 21 will be recognized by sampling out the voltage signal. The voltage presents the one axis position of the coordinate of the contact point 21, such as the position along X-axis. After a predetermined time shift, an equipotential filed is generated between the third electrode 151 and the fourth electrode 152. By sampling out the voltage signal of the contact point, the position of the coordinate of the contact point is acquired along the Y-axis as shown in FIG. 1. By switching the two equipotential fields on the first conductive layer 13 and the second conductive layer 15, the coordinates of the movement of the finger on the film 18 will be acquired. Accordingly, the touch sensor 1 is required to be integrated with a display (usually a liquid crystal display). In this case, the user may see the content of the display in order to touch the touch sensor to input the instruction.

Figure 3A:
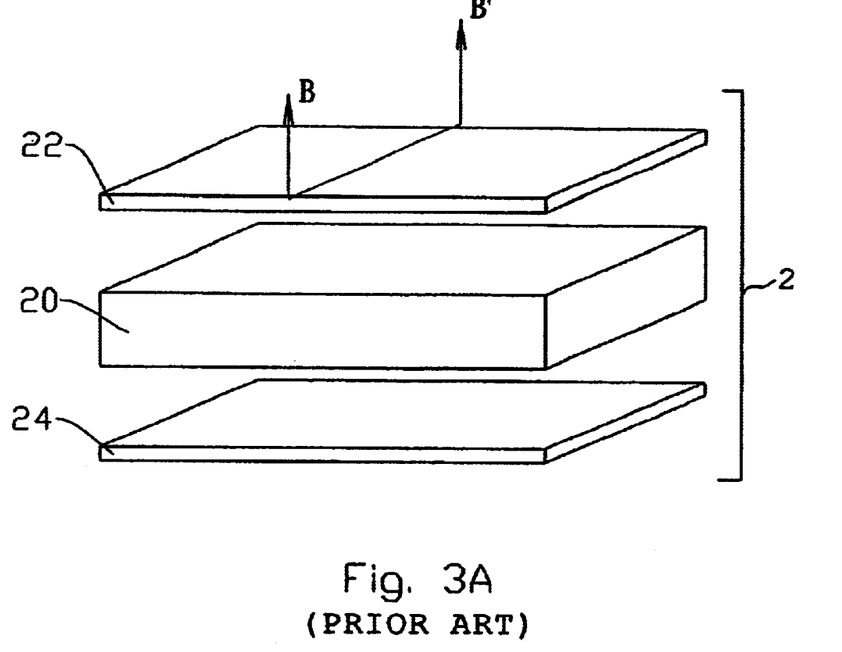
FIG. 3A is the schematic exploded view of the prior known polarizing device.

In an ordinary liquid crystal display, there is implemented a polarizer for polarizing a light beam with a specific polarity. FIG. 3A shows the structure of the polarizer 2. The polarizer 2 comprises a polarizing layer 20, a first protection layer 22 and a second protection layer 24. The polarizing layer 20 is a PVA (Poly Vinyl Alcohol). The characteristic of the PVA is to allow a light beam with a specific polarity to pass. The first protection layer 22 is positioned in the upper side of the polarizing layer 20, made by the material of PET or other insulating materials. The second protection layer 24 is positioned below the polarizing layer 20, made by the material of PET or other insulating materials for protecting the polarizing layer 20. Moreover, the first protection layer 22 and the second protection layer 24 are also for preventing any bending causes to the polarizing layer 20.

Figure 3B:
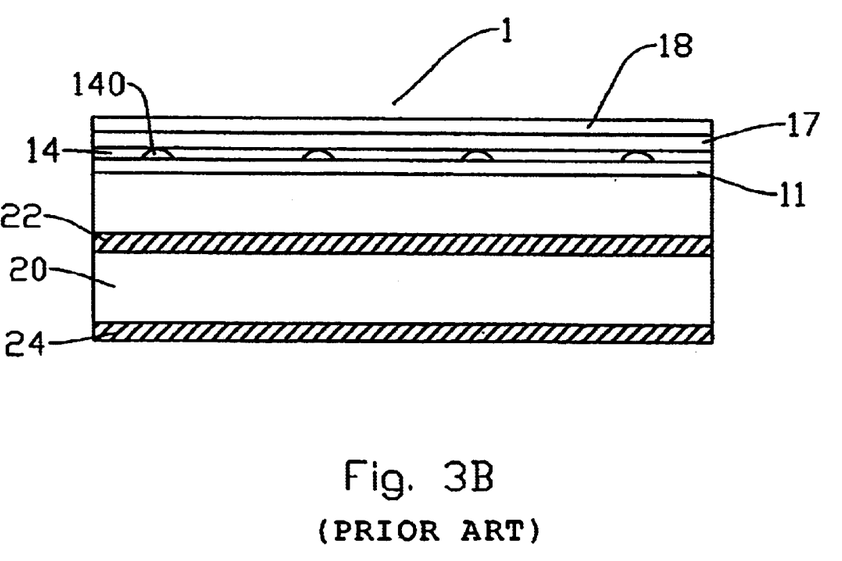
FIG. 3B show the adhesive combination of the prior known touch sensor and the prior known polarizing.

Regarding the cost of the manufactures, Minoura et al. have disclosed a way to combine the touch sensor 1 and polarizer 2 together. See U.S. Pat. No. 6,108,064. Minoura et al. taught to integrate the touch sensor 1 and the polarizer 2 by adhesive. As shown in FIG. 3B, the touch sensor 1 sticks to the polarizer 2 by adhesive. Thus, the liquid crystal display (not shown in FIG. 3B) employing the polarizer 2 is capable of touch features.

However, this kind of manufacturing processes require lots alignment procedures. Further, to paste the adhesive over either the touch sensor 1 or the polarizer 2 will easily leave some adhesive on the touch sensor 1 or the polarizer 2, which causes lots rejected products along with other defected issues. In this case, the present invention provides an integrated touch sensor or called an integrated polarizer for reducing the aforementioned problems.

SUMMARY OF THE INVENTION

It is therefore an object of the present invention to provide a polarizing device integrated with a touch sensor. So that the polarizing device is capable of touch features.

It is another object of the present invention to provide a low-cost device to be implemented to the liquid crystal display.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4A:
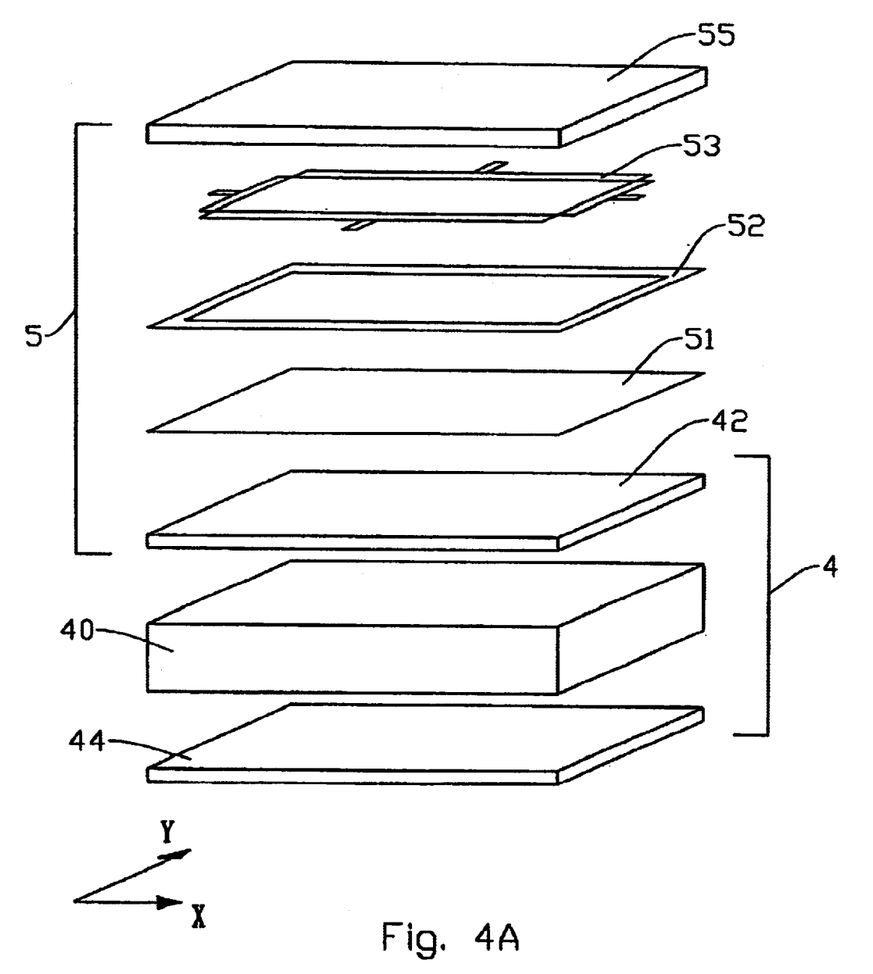
FIG. 4A shows the exploded view of the first embodiment of the present invention.

Please refer to FIG. 4A, this drawing shows the exploded view of the first embodiment of the present invention. The polarizing device 4 includes a polarizing layer 40, a first protection layer 42 and a second protection layer 44. The touch sensing device 5 includes a conductive layer 51, an insulating layer 52, an electrode layer 53 and a hardening coating layer 55. The conductive layer 51 is made of conductive material, for example ITO (Indium Tin Oxide). The conductive layer 51 is sputtered to the first protection layer 42. In this case, the protection layer 42 is able to propagate the electric filed over the surface. The insulating layer is printed to the conductive layer 51. Since the insulating layer 52 is rectangular shape, it would limit the electric distribution over the conductive layer 51. The insulating layer may also be conducted by laser etching to do the same effects, especially to the outside perimeter. Further, the electrode layer 53, composition of silver, is printed to the conductive layer 51. The arrangement of the electrodes may be presented as the shape shown in FIG. 4B as such the first electrode 531, the second electrode 532, the third electrode 533 and the fourth electrode 534. The four electrodes 531, 532, 533 and 534 are along each side of the conductive layer 51. The electrodes 531, 532, 533 and 534 connect to electrode leads 535, 536, 537 and 538 respectively. An equally spread equipotential electric field is generated between the first electrode 531 and the second electrode 532. The electrical field represents the coordinate of X-direction. The equipotential field between the electrode 533 and the electrode 534 may also represent the coordinate of Y-direction. At last, the hardening coating layer 55 is adherent to the electrode layer 53, made by non-conductive hardening materials for protecting the conductive layer 53 or the electrode layer 55 not being scratched or damaged.

Figure 4B:
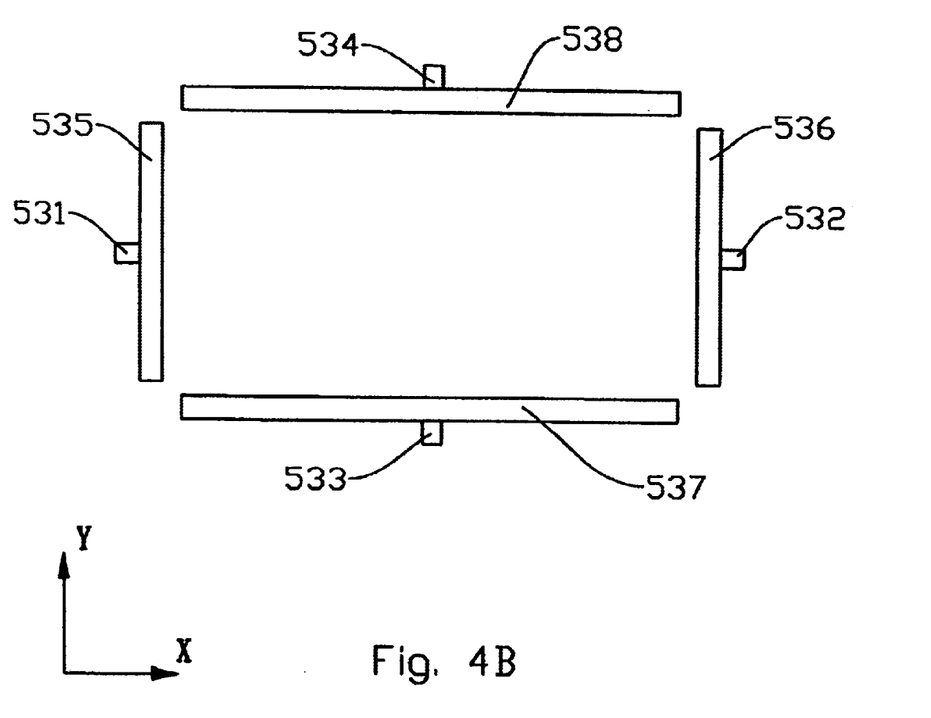
FIG. 4B shows the electrode layer of the first embodiment of the present invention.

Further details of the fist embodiment of the present invention is illustrated as the followings. When the finger of a user touches the screen or moves close the screen. The electric field between the first electrode 531 and the second electrode 532 will be interfered. The size or the shape or interference type may be detected and monitored by the electrode lead 535. In this case, the coordinate of the X-axis may be recognized. After a very short predetermined time period, the electric field will be shifted and generated between the third electrode 533 and the fourth electrode 534. The electric field is also interfered by the finger. Thus, the coordinate of the Y-axis will be detected by monitoring the electrode lead 536. In view of the above demonstration, the integrated polarizing device is capable of touch features and able to cost down during the manufacturing processes, compared to an independent touch sensor and an independent polarizing device.

Figure 5:
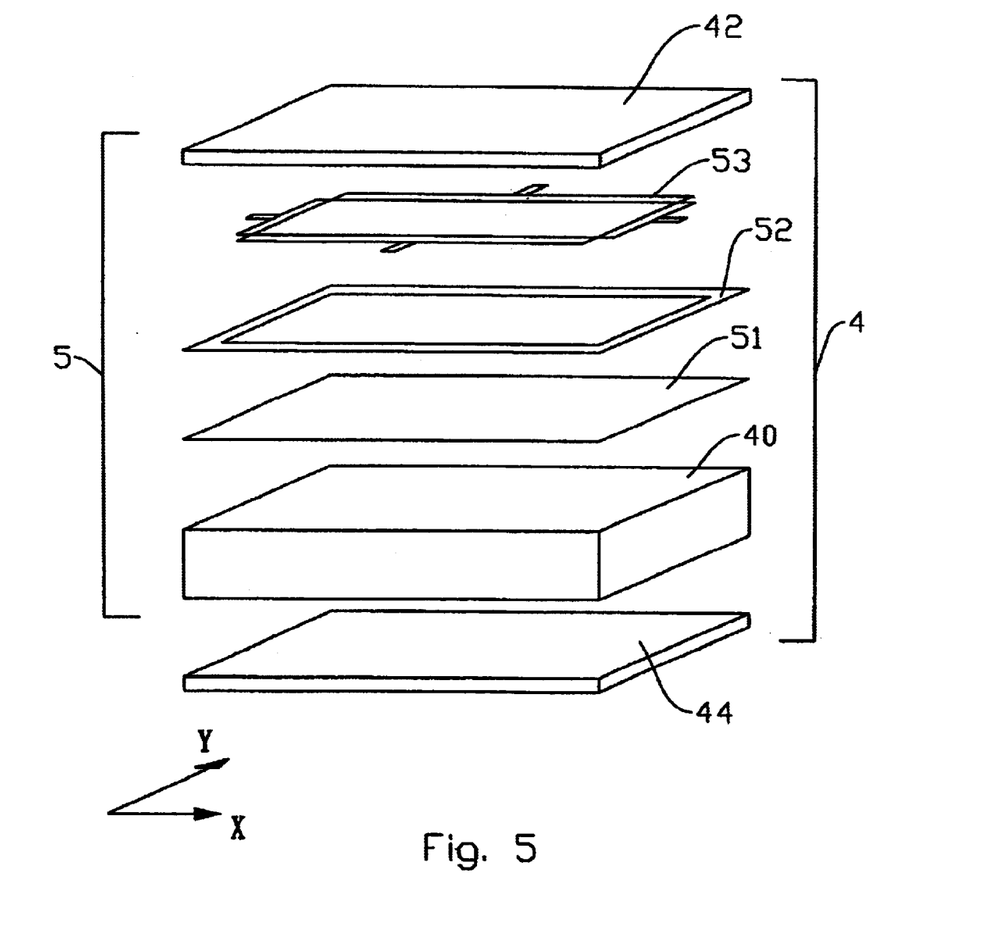
FIG. 5 is the exploded view of the second embodiment of the present invention.

FIG. 5 shows the second embodiment of the present invention. The difference between the first embodiment and the second embodiment is that the conductive layer 51 is sputtered over the polarizing layer 40 of the polarizing device 5. The insulating layer 52 and the electrode layer 53 are printed on the conductive layer in sequence. Finally, the first protection layer 42 substitutes the hardening coating layer 55 of the first embodiment for protecting the conductive layer 53.

The first protection layer 42 may be made by PET material or other non-conductive materials. The hardness of the first protection layer 42 must be enough to protect the conductive layer 53 for avoiding scratches. In this case, the structure, even the manufacturing processes, is simplified.

Figure 6:
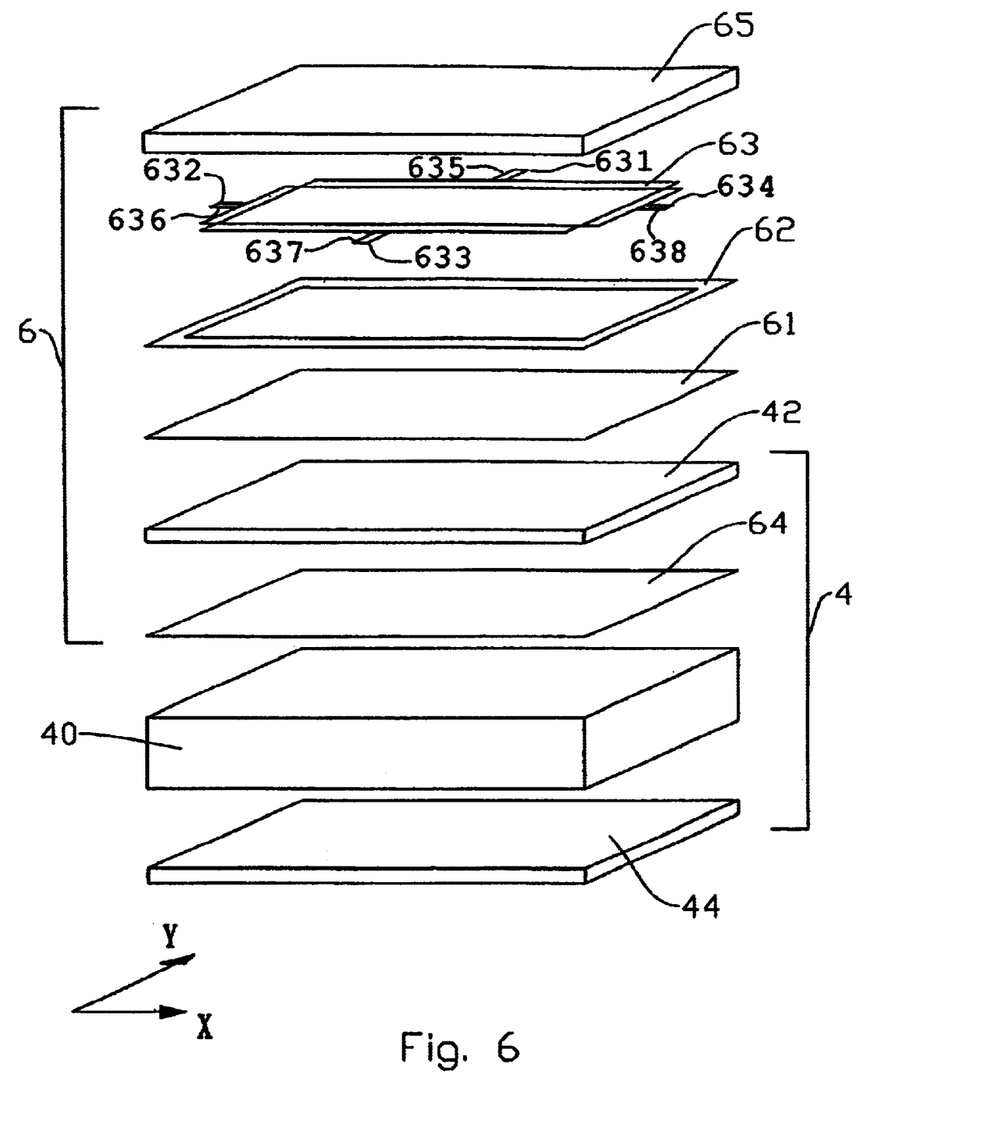
FIG. 6 shows the exploded view of the third embodiment of the present invention.

FIG. 6 shows the third embodiment of the present invention. The difference between the first embodiment and the second embodiment is that a second conductive layer 64 is added. The polarizing device 6 includes the second conductive layer 64, the first protection layer 42, the first conductive layer 61, the insulating layer 62, the electrode layer 63 and the hardening coating layer 65. The first conductive layer 61 and the second conductive layer 64 are spluttered to both side of the first protection layer 42. Further the insulating layer 62, the electrode layer 63 and the hardening coating layer 65 are adherent as shown in the first embodiment of the present invention. Two pairs of opposing electrodes (electrodes 631, 632, 633 and 634) are positioned at four sides of the first conductive layer 61. Each electrode contains an electrode lead (for instance, the electrode leads 635, 636, 637 and 638). By supplying a 5V to the electrode 631 via the electrode lead 635 and supplying a 0V to the electrode 632 via the electrode lead 636, an equivalent electric filed (0V to 5V) is generated over the first conductive. Meanwhile, the second conductive layer is supplied an electrical filed. In this case, capacity effects is generated between the two electric fields. When the user touches the screen, the capacity is interfered. Thus, the coordinate along X-axis is detected by monitoring the output of the electrode lead 635. After a very short time period, by providing 5V and 0V voltages to the electrodes 633 and 634 respectively, the capacity interference caused by finger or other objects will help to find the coordinate along Y-axis.

The aforementioned three embodiments integrate the touch feature of an ordinary touch sensor to a polarizing device. By the present invention, the cost is reduced and the integrated product is therefore obtained. At the post assembling processes, the manufacturer does not need to assemble the polarizing device firstly to an unfinished liquid crystal module then attaching an independent touch sensor.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A polarizing device integrated with a touch sensor comprising:
   a polarizing layer, with composition of the material of poly vinyl alcohol (PVA);
   a conductive layer, tightly integrated with said polarizing layer;
   an electrode layer for propagating electrical signals; and
   a first protection layer, positioned on said electrode layer, made by non-conductive material,
   wherein electrodes of said electrode layer generates a steady electrical field over said conductive layer.

2. The polarizing device of claim 1, further comprising:
   a second protection layer, positioned on the bottom side of said polarizing layer, made by non-conductive materials.

3. The polarizing device of claim 1, wherein said conductive layer is sputtered on said polarizing layer.

* * * * *